(12) United States Patent
Okamatsu et al.

(10) Patent No.: US 6,380,116 B1
(45) Date of Patent: Apr. 30, 2002

(54) DIELECTRIC CERAMIC COMPOSITION AND MONOLITHIC CERAMIC CAPACITOR

(75) Inventors: Toshihiro Okamatsu, Moriyama; Tomoyuki Nakamura, Shiga-ken; Kenji Hori, Shiga-ken; Kotaro Hata, Shiga-ken; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 59 days.

(21) Appl. No.: 09/626,477

(22) Filed: Jul. 26, 2000

(30) Foreign Application Priority Data

Jul. 26, 1999 (JP) ............................................. 11-211082

(51) Int. Cl.$^7$ ............................................. C04B 35/468
(52) U.S. Cl. ..................... 501/138; 501/139; 361/321.4; 361/321.5
(58) Field of Search ................................. 501/138, 139; 361/321.4, 321.5

(56) References Cited

U.S. PATENT DOCUMENTS

| | | | | |
|---|---|---|---|---|
| 5,268,342 A | * | 12/1993 | Nishiyama et al. | 501/138 |
| 5,668,691 A | | 9/1997 | Ito et al. | 361/13 |
| 5,668,694 A | * | 9/1997 | Sato et al. | 361/321.4 |
| 5,862,034 A | * | 1/1999 | Sato et al. | 361/321.5 |
| 6,225,250 B1 | * | 5/2001 | Wada et al. | 501/137 |
| 6,245,433 B1 | * | 6/2001 | Nakamura et al. | 428/469 |

FOREIGN PATENT DOCUMENTS

GB        2308360        6/1997

\* cited by examiner

*Primary Examiner*—Karl Group
(74) *Attorney, Agent, or Firm*—Ostrolenk, Faber, Gerb & Soffen, LLP

(57) ABSTRACT

A dielectric ceramic composition comprises a compound oxide comprising barium titanate $Ba_mTiO_3$ as a major component and $RO_{3/2}$, $CaO$, $MgO$, and $SiO_2$, as accessory components, wherein R is at least one element selected from the group consisting of Y, Sm, Eu, Gd, Tb, Dy, Ho, Er, Tm and Yb, wherein the compound oxide satisfies the following relationship: $100Ba_mTiO_3+aRO_{3/2}+bCaO+cMgO+dSiO_2$, wherein, on a molar basis, $0.990 \leq m \leq 1.030$, $0.5 \leq a \leq 6.0$, $0.10 \leq b \leq 5.00$, $0.010 \leq c < 1.000$, and $0.05 \leq d < 2.00$. The dielectric ceramic composition satisfies the B characteristic defined by the Japanese Industrial Standard (JIS) and the X7R characteristic defined by the EIA standard with respect to dependence of electrostatic capacitance on temperature, and has a large CR product of the insulation resistance and the electrostatic capacitance. A monolithic ceramic capacitor which includes thin dielectric layers composed of this dielectric ceramic composition is highly reliable.

18 Claims, 1 Drawing Sheet

DIELECTRIC CERAMIC COMPOSITION AND MONOLITHIC CERAMIC CAPACITOR

BACKGROUND OF THE INVENTION

1. Field of the Invention

The present invention relates to dielectric ceramic compositions and monolithic ceramic capacitors using the same.

2. Description of the Related Art

In general, a monolithic ceramic capacitor is produced as follows. Dielectric sheets are prepared. Each dielectric sheet is primarily composed of, for example, $BaTiO_3$ and a surface is coated by an internal electrode material. These dielectric sheets are laminated, are thermally compressed, and are sintered to form a dielectric ceramic provided with internal electrodes. External electrodes in contact with each internal electrode are formed by baking on both side faces of the dielectric ceramic. The monolithic ceramic capacitor is thereby formed.

Materials used for the internal electrodes are noble metals, e.g., platinum, gold, palladium and alloys thereof, e.g., a silver-palladium alloy, because these metals are not oxidized when they are sintered together with dielectric materials. However, the use of such expensive metals is the largest factor in increasing the production costs of monolithic ceramic capacitors, although these electrode materials have superior characteristics.

Relatively inexpensive base metals, such as nickel and copper, have recently been used as materials for the internal electrodes; however, these base metals are readily oxidized in an oxidizing atmosphere at an elevated temperature, and these materials do not function as internal electrodes. When the sheets are sintered in a neutral or reducing atmosphere to prevent oxidation of the base metals for the internal electrodes, the dielectric ceramic layers are undesirably reduced and modified into semiconductor layers.

In order to solve this problem, for example, Japanese Examined Patent Application Publication No. 57-42588 discloses a dielectric ceramic composition comprising a barium titanate solid solution having a ratio of the barium site to the titanium site which is higher than the stoichiometric ratio, and Japanese Unexamined Patent Application Publication No. 61-101459 discloses a dielectric ceramic composition comprising a barium titanate solid solution and oxides of rare earth elements, such as La, Nd, Sm. Dy and Y.

Moreover, dielectric ceramic compositions exhibiting a small change in dielectric constant with temperature are disclosed. For example, a $BaTiO_3$-$CaZrO_3$-MnO-MgO-based composition is disclosed in Japanese Unexamined Patent Application Publication No. 62-256422 and a $BaTiO_3$-(Mg,Zr,Sr,Ca) O-$B_2O_3$-$SiO_2$-based composition is disclosed in Japanese Examined Patent Application Publication No. 61-14611.

Since these dielectric ceramic compositions are not reduced or modified into semiconductors during sintering steps in reducing atmospheres, the dielectric ceramic compositions facilitate use of base metals, such as nickel, as internal electrodes of the monolithic ceramic capacitors.

With recent trends toward miniaturization of electronic parts, miniaturization and increasing capacitance are also required for monolithic ceramic capacitors. The requirements for a dielectric ceramic composition used in such a monolithic ceramic capacitor includes a high dielectric constant, a small change in dielectric constant with temperature and a high insulating property for ensuring high reliability when the dielectric ceramic composition is used as thin films.

Conventional dielectric ceramic compositions are designed so that the monolithic ceramic capacitor may be used in low electric fields. When they are used as thin films, that is, when they are use in strong electric fields, some problems arise, such as significant deterioration of insulating resistance, dielectric strength, and reliability. When thin ceramic dielectric layers are formed using conventional dielectric ceramic compositions, the resulting monolithic ceramic capacitors must be used at lower rated voltages, depending on the thickness of the ceramic dielectric layer.

Although the dielectric ceramic compositions disclosed in Japanese Examined Patent Application Publication No. 57-42588 and Japanese Unexamined Patent Application Publication No. 61-101459 have large dielectric constants, the crystal grain sizes in the resulting ceramic are greater. When the thickness of one dielectric ceramic layer is decreased to 10 $\mu$m or less, the number of the crystal grains which are present in each layer is significantly decreased, resulting in deterioration of reliability. Moreover, the resulting monolithic ceramic capacitors exhibit large changes in dielectric constant with temperature. Accordingly, these conventional monolithic ceramic capacitors do not satisfy market requirements.

The dielectric ceramic composition disclosed in Japanese Unexamined Patent Application Publication No. 62-256422 has a relatively high dielectric constant. Moreover, the resulting ceramic composite contains small crystal grains and exhibits a small change in dielectric constant with temperature. However, $CaZrO_3$ and $CaTiO_3$, which is formed during the sintering readily form a secondary phase together with MnO, etc. Thus, the resulting dielectric ceramic layer having a small thickness is less reliable at high temperatures.

The dielectric ceramic composition disclosed in Japanese Examined Patent Application Publication No. 61-14611 does not satisfy the X7R characteristic defined by the Electronic Industries Alliance (EIA) Standard, that is, a rate of change in electrostatic capacitance of within ±15% in a temperature range from –55° C. to +125° C.

In order to solve this problem, $BaTiO_3$—$Re_2O_3$—$Co_2O_3$-based compositions, wherein Re is a rare earth element, are disclosed in Japanese Unexamined Patent Application Publication Nos. 5-9066, 5-9067, and 5-9068. Thin dielectric ceramic layers formed of these compositions, however, are still less reliable and do not sufficiently satisfy market requirements.

SUMMARY OF THE INVENTION

It is an object of the present invention to provide a dielectric ceramic composition suitable for dielectric ceramic layers of a monolithic ceramic capacitor which satisfies the B characteristic defined by the Japanese Industrial Standard (JIS) and the X7R characteristic defined by the EIA standard with respect to dependence of electrostatic capacitance on temperature, which has a relative dielectric constant ($\epsilon$) of at least 2,500, a product (CR product) of insulation resistance (R) and electrostatic capacitance (C) when a voltage of 4 kVDC/mm is applied at room temperature of at least 5,000 $\Omega \cdot F$., and which has a prolonged service life with respect to insulating resistance in a high-temperature, high-voltage accelerated test.

It is another object of the present invention to provide a monolithic ceramic capacitor having improved reliability when the thickness of the dielectric ceramic layers is decreased.

According to an aspect of the present invention, a dielectric ceramic composition in accordance with the present invention comprises a compound oxide comprising barium titanate $Ba_mTiO_3$ as a major component and $RO_{3/2}$, CaO, MgO, and $SiO_2$, as accessory components, wherein R is at least one element selected from the group consisting of Y, Sm, Eu, Gd, Tb, Dy, Ho, Er, Tm and Yb, wherein the compound oxide satisfies the following relationship:

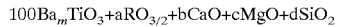
$100Ba_mTiO_3+aRO_{3/2}+bCaO+cMgO+dSiO_2$ wherein, on a molar basis, $0.990 \leq m \leq 1.030$, $0.5 \leq a \leq 6.0$, $0.10 \leq b \leq 5.00$, $0.010 \leq c < 1.000$, and $0.05 \leq d < 2.00$.

The compound oxide may further comprise a boron-containing compound as another accessory component in an amount not greater than about 5.5 moles on the basis of $B_2O_3$.

The compound oxide may further comprise a compound containing at least one element selected from the group consisting of Mn, Zn, Ni, Co and Cu as another accessory component, in an amount not greater than about 5 moles on the basis of the oxide MO of the element M.

The compound oxide may further comprise a compound containing Zr, Hf and at least one element selected from the group consisting of Ba, Ca and Sr as other accessory components, in an amount not greater than x7.0 moles on the basis of $X(Zr,Hf)O_3$ wherein X is at least one of Ba, Ca and Sr.

According to another aspect of the present invention, a monolithic ceramic capacitor comprises a plurality of dielectric ceramic layers, internal electrodes formed between the dielectric ceramic layers, and external electrodes, electrically connected to the internal electrodes, wherein each of the dielectric ceramic layers comprises the above-mentioned dielectric ceramic composition and each of the internal electrodes comprises a base metal.

DESCRIPTION OF THE PREFERRED EMBODIMENT

Figure 1:
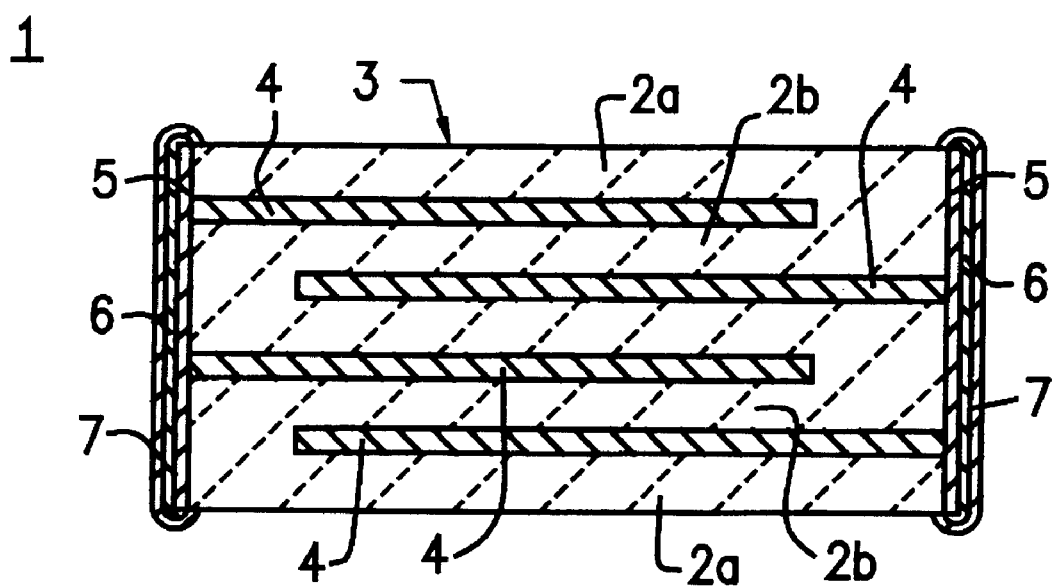
FIG. 1 is a cross-sectional view of a monolithic ceramic capacitor in accordance with the present invention.

A preferred embodiment of a monolithic ceramic capacitor in accordance with the present invention will now be described with reference to the cross-sectional view shown in FIG. 1.

The monolithic ceramic capacitor 1 includes a plurality of internal electrodes 4 and a plurality of dielectric ceramic layers 2a and 2b, and the internal electrodes 4 and the dielectric ceramic layers 2a and 2b are alternately laminated and constitute a rectangular ceramic laminate 3. External electrodes 5 are provided on both sides of the ceramic laminate 3 and one of the external electrodes 5 is connected to some of the internal electrodes 4, and the other external electrode 5 is connected to the other internal electrodes 4. Each of the external electrodes 5 is covered with a first plating layer 6 composed of nickel or copper and a second plating layer 7 composed of solder or tin thereon.

The dielectric ceramic layer is composed of a compound oxide containing barium titanate $Ba_mTiO_3$ as a major component and $RO_{3/2}$, CaO, MgO and $SiO_2$, as accessory components, wherein R is at least one element selected from the group consisting of Y, Sm, Eu, Gd, Tb, Dy, Ho, Er, Tm and Yb, and the compound oxide satisfies the following relationship: $100Ba_mTiO_3+aRO_{3/2}+bCaO+cMgO+dSiO_2$ wherein, on a molar basis, $0.990 \leq m \leq 1.030$, $0.5 \leq a \leq 6.0$, $0.10 \leq b \leq 5.00$, $0.010 \leq c < 1.000$, and $0.05 \leq d < 2.00$.

The compound oxide preferably further contains (1) a boron-containing compound, (2) a compound containing at least one element selected from the group consisting of Mn, Zn, Ni, Co and Cu, and/or (3) a compound containing Zr, Hf, and at least one element selected from the group consisting of Ba, Ca and Sr, in specific amounts, as other accessory components.

The dielectric ceramic layer composed of the above compound oxide can maintain superior characteristics even when the dielectric ceramic layer is sintered in a reducing atmosphere, and satisfies the B characteristic defined by the JIS and the X7R characteristic defined by the EIA standard with respect to dependence of electrostatic capacitance on temperature and the CR product of insulation resistance (R) and electrostatic capacitance (C) when a voltage of 4 kVDC/mm is applied at room temperature of at least 5,000 $\Omega \cdot F$. Since the dielectric ceramic layer has a prolonged service life with respect to insulating resistance in high-temperature, high-voltage accelerated test, the monolithic ceramic capacitor has improved reliability when the monolithic ceramic capacitor is thin.

The internal electrode of the monolithic ceramic capacitor may comprise a base metal or an alloy thereof, e.g., nickel, copper or a nickel alloy. The internal electrode may further comprise a small amount of ceramic powder to prevent structural defects.

The external electrode may comprise a sintered layer formed of various powdered conductive metals, such as silver, palladium, silver-palladium and copper; or may comprise a sintered layer formed of the above powdered conductive metals and various types of glass frit, e.g., $B_2O_3$—$Li_2O$—$SiO_2$—BaO type, $B_2O_3$—$SiO_2$—BaO type, $Li_2O'SiO_2$—BaO type and $B_2O_3$—$SiO_2$—ZnO type. The external electrode is covered with a plating layer formed of nickel or copper. The plating layer may be omitted depending on use.

EXAMPLES

Example 1

Oxalic acid was added to an aqueous solution containing predetermined amounts of $TiCl_4$ and $Ba(NO_3)_2$ to form barium titanyl oxalate $\{BaTiO(C_2O_4) \cdot 4H_2O\}$ as a precipitate. $Ba(OH)_2$ or $TiO_2$ was added to the precipitate to adjust the Ba/Ti ratio, that is, the coefficient m, and the mixture was pyrolyzed at a temperature of at least 1,000° C. A variety of barium titanates $Ba_mTiO_3$ having different coefficients m shown in Table 1 were thereby synthesized.

As accessory components, $Y_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, CaO, MgO and $SiO_2$ were prepared.

These powdered raw materials were compounded according to Table 1 so that the composition satisfies the following relationship: $100Ba_mTiO_3+aRO_{3/2}+bCaO+cMgO+dSiO_2$, and a polyvinyl butyral binder and an organic solvent, such as ethanol, were added thereto. Each mixture was mixed by a wet process to form a ceramic slurry. The ceramic slurry was coated by a doctor blade process to form a ceramic green sheet.

TABLE 1

Composition: 100 $Ba_mTiO_3$-$aRO_{3/2}$-$bCaO$-$cMgO$-$dSiO_2$

| Sample No. | $Ba_m$ $TiO_3$ m | $aRO_{3/2}$ R | a | R | a | R | a | Total a | CaO b | MgO c | $SiO_2$ d |
|---|---|---|---|---|---|---|---|---|---|---|---|
| *1  | 0.980 | Yb | 1.0 | Ho | 1.0 | Tb | 1.0 | 3.0 | 2.00 | 0.050 | 0.05 |
| *2  | 1.040 | Er | 1.0 | —  |     | —  |     | 1.0 | 0.30 | 0.030 | 1.00 |
| *3  | 1.010 | Gd | 0.1 | Dy | 0.1 | Er | 0.1 | 0.3 | 3.50 | 0.700 | 1.50 |
| *4  | 1.005 | Dy | 8.0 | —  |     | —  |     | 8.0 | 4.00 | 0.800 | 1.80 |
| *5  | 1.010 | Tm | 2.0 | Sm | 1.0 | —  |     | 3.0 | 0.05 | 0.300 | 1.00 |
| *6  | 1.005 | Ho | 0.5 | Eu | 2.5 | —  |     | 3.0 | 7.00 | 0.100 | 1.60 |
| *7  | 1.005 | Sm | 0.5 | Ho | 0.5 | —  |     | 1.0 | 2.00 | 0.004 | 0.70 |
| *8  | 1.010 | Tm | 5.0 | —  |     | —  |     | 5.0 | 1.50 | 1.000 | 0.90 |
| *9  | 1.010 | Yb | 3.5 | Gd | 1.0 | —  |     | 4.5 | 2.00 | 0.500 | 0.02 |
| *10 | 1.010 | Er | 0.5 | Yb | 0.5 | —  |     | 1.0 | 1.00 | 0.400 | 2.00 |
| 11  | 0.990 | Yb | 0.5 | Gd | 1.0 | Dy | 1.0 | 2.5 | 1.00 | 0.900 | 0.20 |
| 12  | 1.030 | Er | 2.0 | —  |     | —  |     | 2.0 | 2.00 | 0.020 | 1.50 |
| 13  | 1.010 | Eu | 0.5 | —  |     | —  |     | 0.5 | 0.50 | 0.800 | 0.20 |
| 14  | 1.000 | Tb | 6.0 | —  |     | —  |     | 6.0 | 1.00 | 0.020 | 0.80 |
| 15  | 1.005 | Sm | 3.0 | —  |     | —  |     | 3.0 | 0.10 | 0.100 | 1.00 |
| 16  | 1.005 | Tb | 1.0 | Tm | 1.0 | —  |     | 2.0 | 5.00 | 0.500 | 1.50 |
| 17  | 1.010 | Sm | 1.0 | Ho | 1.0 | —  |     | 2.0 | 2.00 | 0.010 | 1.00 |
| 18  | 1.005 | Ho | 2.5 | —  |     | —  |     | 2.5 | 3.00 | 0.300 | 0.05 |
| 19  | 1.010 | Er | 1.0 | Eu | 1.0 | Tb | 0.5 | 2.5 | 0.50 | 0.700 | 1.50 |
| 20  | 1.005 | Dy | 3.5 | —  |     | —  |     | 3.5 | 4.00 | 0.200 | 1.20 |
| 21  | 1.005 | Dy | 2.0 | Er | 1.0 | —  |     | 3.0 | 2.00 | 0.300 | 1.40 |

A conductive paste containing nickel as a major component was applied onto the ceramic green sheet by screen printing to form a conductive paste layer for forming an internal electrode. A plurality of the ceramic green sheets was laminated so that the conductive paste layers on the ceramic green sheets were alternately exposed at two opposing sides to form a laminate. The laminate was heated in a nitrogen atmosphere at a temperature of 350° C. to burn off the binder, and was then sintered in a reducing gas atmosphere containing $H_2$, $N_2$ and $H_2O$ and having an oxygen partial pressure of $10^{-9}$ to $10^{-12}$ MPa at the temperature shown in Table 2 for 2 hours to prepare a ceramic compact.

A silver paste containing $B_2O_3$—$Li_2O$—$SiO_2$—$BaO$-based glass frit was applied onto the two opposing sides of the ceramic compact and was fired in a nitrogen atmosphere to form external electrodes which are connected to internal electrodes.

The resulting monolithic ceramic capacitor had a width of 1.6 mm, a length of 3.2 mm and a thickness of 1.2 mm, and each dielectric ceramic layer disposed between the internal electrodes had a thickness of 3 μm. The monolithic ceramic capacitor includes 100 effective dielectric ceramic layers and the opposing area of one face of each electrode layer was 2.1 $mm^2$.

Electrical characteristics of the monolithic ceramic capacitor were measured. The electrostatic capacitance (C) and the dielectric loss (tan δ) were measured at a 1-kHz frequency, 1 Vrms and a temperature of 25° C., and the relative dielectric constant (ε) was calculated from the electrostatic capacitance. A 12-volt direct current was applied to the monolithic ceramic capacitor for 2 minutes to measure the insulation resistance (R) at+25° C. in an electric field of 4 kV/mm, and the CR product of the electrostatic capacitance (C) and the insulation resistance (R) was determined.

Regarding rates of change in electrostatic capacitance with temperature, rates ($\Delta C/C_{20}$) of change at −25° C. and 85° C. based on the electrostatic capacitance at 20° C., and rates ($\Delta C/C_{25}$) of change at −55° C. and 125° C. based on the electrostatic capacitance at 25° C. were measured.

In a high-temperature loading test, 36 samples for each monolithic ceramic capacitor were used. A 45-volt direct current was applied to each sample at 175° C. so as to yield an electric field of 15 kV/mm, and a change in insulation resistance over time was measured. The time when the insulation resistance (R) became $10^6$ Ω or less was defined as the service life of each sample. The average service life of 36 samples was calculated.

The results are shown in Table 2 in which sample numbers with asterisks indicate that the samples are outside the range of the present invention, and the other samples are within the range of the present invention.

TABLE 2

| Sample No. | Sintering Temperature (° C.) | ε | tan δ (%) | Rate of Change in Capacitance with Temperature $\Delta C/C_{20}$ (%) −25° C. | +85° C. | Rate of Change in Capacitance with Temperature $\Delta C/C_{25}$ (%) −55° C. | +125° C. | CR Product (Ω · F) | Average Service Life (h) |
|---|---|---|---|---|---|---|---|---|---|
| *1  | 1240 |      |     | Became a Semiconductor |      |      |       |       |     |
| *2  | 1280 | 3220 | 1.7 | −0.2 | −7.8 | −2.4 | −13.2 | 5800  | 10  |
| *3  | 1220 | 3350 | 1.8 | −0.1 | −7.9 | −2.7 | −15.8 | 9000  | 200 |
| *4  | 1280 | 1600 | 1.5 | −0.5 | −8.2 | −2.3 | −13.7 | 6500  | 180 |
| *5  | 1240 | 2890 | 1.5 | −0.2 | −7.5 | −2.2 | −12.5 | 6800  | 20  |
| *6  | 1240 | 1820 | 1.4 | −0.3 | −8.0 | −2.6 | −13.9 | 10100 | 210 |
| *7  | 1220 | 3410 | 1.6 | −0.2 | −7.6 | −2.7 | −15.7 | 7800  | 200 |
| *8  | 1380 | 2550 | 1.6 | 0.0  | −8.0 | −2.7 | −12.2 | 6200  | 240 |
| *9  | 1380 | 2810 | 1.7 | 0.1  | −7.7 | −2.4 | −12.7 | 5200  | 230 |
| *10 | 1200 | 3180 | 1.5 | 0.2  | −7.7 | −2.6 | −15.6 | 11000 | 210 |
| 11  | 1240 | 2850 | 1.6 | −0.1 | −7.9 | −2.7 | −12.1 | 5900  | 190 |
| 12  | 1260 | 2940 | 1.4 | 0.0  | −8.2 | −2.3 | −13.3 | 6400  | 240 |
| 13  | 1220 | 3510 | 1.8 | 0.1  | −8.0 | −2.3 | −13.9 | 9000  | 190 |
| 14  | 1280 | 2510 | 1.7 | 0.2  | −7.6 | −2.2 | −13.6 | 8700  | 240 |
| 15  | 1240 | 2840 | 1.7 | 0.3  | −8.1 | −2.6 | −12.1 | 7700  | 170 |
| 16  | 1240 | 2520 | 1.5 | 0.4  | −7.7 | −2.7 | −13.3 | 8300  | 190 |
| 17  | 1220 | 3150 | 1.6 | −1.0 | −8.2 | −2.7 | −13.8 | 7800  | 260 |
| 18  | 1280 | 2950 | 1.6 | −0.9 | −8.3 | −2.2 | −12.3 | 6800  | 210 |
| 19  | 1220 | 2980 | 1.7 | −0.8 | −7.7 | −2.6 | −13.5 | 8600  | 190 |

TABLE 2-continued

| Sample No. | Sintering Temperature (° C) | $\epsilon$ | tan $\delta$ (%) | Rate of Change in Capacitance with Temperature $\Delta C/C_{20}$ (%) | | Rate of Change in Capacitance with Temperature $\Delta C/C_{25}$ (%) | | CR Product ($\Omega \cdot F$) | Average Service Life (h) |
|---|---|---|---|---|---|---|---|---|---|
| | | | | −25° C. | +85° C. | −55° C. | +125° C. | | |
| 20 | 1240 | 2880 | 1.5 | −0.7 | −7.6 | −2.7 | −12.2 | 6800 | 230 |
| 21 | 1240 | 2820 | 1.8 | −0.6 | −7.5 | −2.6 | −12.9 | 7600 | 220 |

Table 2 shows that each dielectric ceramic composition according to the present invention satisfies the B characteristic defined by the Japanese Industrial Standard (JIS) and the X7R characteristic defined by the Electronic Industries Alliance (EIA) standard with respect to dependence of electrostatic capacitance on temperature, and has a relative dielectric constant ($\epsilon$) of at least 2,500, and a CR product of at least 5,000 $\Omega \cdot F$.

The reasons for limiting the composition will now be described.

The coefficient m indicating the Ba/Ti ratio in $Ba_m TiO_3$ is limited to a range of $0.990 \leq m \leq 1.030$. At m<0.990, the sample is modified into a semiconductor, as shown by sample No. 1, whereas at m>1.030, the high-temperature service life is decreased as shown by sample No. 2.

The $RO_{3/2}$ content a is limited to a range of $0.5 \leq a \leq 6.0$. The rate of change in electrostatic capacitance does not satisfy the X7R characteristic at a<0.5, as in sample No. 3, whereas the relative dielectric constant ($\epsilon$) is less than 2,500 at a >6.0, as in sample No. 4.

The CaO content b is limited to a range of $0.10 \leq b \leq 5.00$. The high-temperature service life is decreased at b <0.10, as in sample No. 5, whereas the relative dielectric constant ($\epsilon$) is less than 2,500 at b>5.00, as in sample No. 6.

The MgO content c is limited to a range of $0.10 \leq c < 1.000$. The rate of change in electrostatic capacitance with temperature does not satisfy the X7R characteristic at c<0.10, as in sample No. 7, whereas sintering is unsatisfactory at c>1.000, as in sample No. 8.

The $SiO_2$ content d is limited to a range of $0.05 \leq d < 2.00$. Sintering is unsatisfactory at d<0.05, as in sample No. 9, whereas the rate of change in electrostatic capacitance with temperature does not satisfy the X7R characteristic at $d \geq 2.0$, as in sample No. 10.

Example 2

$Ba_{1.005} TiO_3$ was prepared as in Example 1. Also $Dy_2O_3$, CaO, MgO, $SiO_2$ and $B_2O_3$ were prepared. These powdered raw materials were compounded so that the compositions satisfied the following relationship: $100Ba_{1.005}TiO_3 + 3.5DyO_{3/2} + 4.0CaO + 0.2MgO + 1.2SiO_2 + eB_2O_3$ wherein each coefficient was based on moles and the coefficients e are shown in Table 3. These compositions correspond to a composition of sample No. 20 in Example 1 which further contains $B_2O_3$ as an accessory component.

TABLE 3

| Sample No. | $eB_2O_3$ e |
|---|---|
| 22 | 6.00 |
| 23 | 1.50 |
| 24 | 0.35 |
| 25 | 5.50 |

Using these compositions, monolithic ceramic capacitors were produced as in Example 1. The relative dielectric constant ($\epsilon$), the dielectric loss (tan$\delta$), the CR product, the rate of change in capacitance with temperature and the average service life of each monolithic ceramic capacitor at high-temperature loading were measured as in Example 1. The results are shown in Table 4.

TABLE 4

| Sample No. | Sintering Temperature (° C) | $\epsilon$ | tan $\delta$ (%) | Rate of Change in Capacitance with Temperature $\Delta C/C_{20}$ (%) | | Rate of Change in Capacitance with Temperature $\Delta C/C_{25}$ (%) | | CR Product ($\Omega \cdot F$) | Average Service Life (h) |
|---|---|---|---|---|---|---|---|---|---|
| | | | | −25° C. | +85° C. | −55° C. | +125° C. | | |
| 22 | 940 | 2590 | 1.9 | −0.7 | −9.9 | −2.3 | −15.8 | 5900 | 180 |
| 23 | 1140 | 2710 | 1.7 | 0.2 | −8.6 | −2.7 | −14.1 | 7300 | 250 |
| 24 | 1180 | 2840 | 1.5 | 0.3 | −7.7 | −2.4 | −12.7 | 8300 | 320 |
| 25 | 960 | 2630 | 1.8 | −0.1 | −9.1 | −2.6 | −14.2 | 6600 | 190 |

As shown in comparisons of sample Nos. 23 to 25 in Table 4 with sample No. 20 in Example 1, the compositions containing x5.5 moles or less of $B_2O_3$ as an accessory component can be sintered at a lower temperature.

Example 3

$Ba_{1.005} TiO_3$ was prepared as in Example 1. Also $Dy_2O_3$, $Er_2O_3$, CaO, MgO, $SiO_2$, MnO, ZnO, NiO, CoO and CuO were prepared. These powdered raw materials were compounded so that the compositions satisfied the following relationship: $100Ba_{1.005}TiO_3+2.0DyO_{3/2}+1.0ErO_{3/2}+2.0CaO+0.3MgO+1.4SiO_2+fMO$ wherein each coefficient was based on moles and the type and the coefficient f of the element M were shown in Table 5. These compositions correspond to a composition of sample No. 21 in Example 1 which further contains at least one oxide of the element M selected from Mn, Zn, Ni, Co and Zn, as an accessory component MO.

TABLE 5

| Sample | fMO | | | | Total |
|---|---|---|---|---|---|
| No. | M | f | M | f | f |
| 26 | Mn | 3.0 | Zn | 4.0 | 7.0 |
| 27 | Mn | 6.0 | — | | 6.0 |
| 28 | Zn | 2.0 | Ni | 3.0 | 5.0 |
| 29 | Cu | 2.0 | — | | 2.0 |
| 30 | Mn | 0.3 | Co | 0.2 | 0.5 |

Using these compositions, monolithic ceramic capacitors were produced as in Example 1. The relative dielectric constant ($\epsilon$), the dielectric loss (tan$\delta$), the CR product, the rate of change in capacitance with temperature and the average service life of each monolithic ceramic capacitor were measured as in Example 1. The results are shown in Table 6.

TABLE 6

| Sample No. | Sintering Temperature (°C) | $\epsilon$ | tan $\delta$ (%) | Rate of Change in Capacitance with Temperature $\Delta C/C_{20}$ (%) | | Rate of Change in Capacitance with Temperature $\Delta C/C_{25}$ (%) | | CR Product ($\Omega \cdot F$) | Average Service Life (h) |
|---|---|---|---|---|---|---|---|---|---|
| | | | | −25° C. | +85° C. | −55° C. | +125° C. | | |
| 26 | 1300 | 1830 | 1.3 | 0.1 | −7.7 | −2.7 | −12.9 | 300 | 10 |
| 27 | 1280 | 2180 | 1.5 | 0.0 | −7.6 | −2.7 | −12.8 | 700 | 30 |
| 28 | 1280 | 2430 | 1.5 | 0.1 | −7.5 | −2.2 | −12.7 | 10300 | 240 |
| 29 | 1260 | 2790 | 1.6 | 0.2 | −7.8 | −2.6 | −13.3 | 11800 | 290 |
| 30 | 1240 | 2880 | 1.6 | 0.3 | −7.7 | −2.7 | −12.8 | 12200 | 260 |

As shown in comparisons of sample Nos. 28 to 30 in Table 6 with sample No. 21 in Example 1, the compositions containing about 5.0 moles or less of MO as an accessory component causes an increase in the CR product.

Example 4

$Ba_{1.005}TiO_3$ was prepared as in Example 1. Also $Er_2O_3$, $Eu_2O_3$, $Tb_2O_3$, CaO, MgO and $SiO_2$ were prepared. Moreover, $CaZrO_3$, $SrZrO_3$, $BaZrO_3$, $CaHfO_3$, $SrHfO_3$, and $BaHfO_3$ were prepared as constituents represented by $X(Zr,H)O_3$ wherein X was at least one element selected from Ba, Ca and Sr. These powdered raw materials were compounded so that the compositions satisfied the following relationship: $100Ba_{1.005}TiO_3+1.0ErO_{3/2}+1.0EuO_{3/2}+0.5TbO_{3/2}+0.5CaO+0.7MgO+1.5SiO_2+gX(Zr,Hf)O_3$ wherein each coefficient was based on moles and the compositions and the coefficients f of the constituent $X(Zr,Hf)O_3$ are shown in Table 7. These compositions correspond to the composition of sample No. 19 in Example 1 which further contains $X(Zr,Hf)O_3$ as an accessory component wherein X is at least one element selected from Ba, Ca and Sr.

TABLE 7

| Sample No. | g | | | | | | Total g |
|---|---|---|---|---|---|---|---|
| | $CaZrO_3$ | $SrZrO_3$ | $BaZrO_3$ | $CaHfO_3$ | $SrHfO_3$ | $BaHfO_3$ | |
| 31 | 0 | 3.5 | 5.00 | 0 | 0.50 | 0 | 9.00 |
| 32 | 2.00 | 6.00 | 0 | 0 | 0 | 0 | 8.00 |
| 33 | 0.30 | 0.60 | 0 | 0.30 | 0 | 0 | 1.20 |
| 34 | 0 | 0 | 2.40 | 0 | 0 | 0 | 2.40 |
| 35 | 0 | 3.00 | 3.00 | 0 | 0.50 | 0.50 | 7.00 |

Using these compositions, monolithic ceramic capacitors were produced as in Example 1. The relative dielectric constant ($\epsilon$), the dielectric loss (tan$\delta$), the CR product, the rate of change in capacitance with temperature and the average service life of each monolithic ceramic capacitor were measured as in Example 1. The results are shown in Table 8.

TABLE 8

| Sample No. | Sintering Temperature (°C) | $\epsilon$ | tan $\delta$ (%) | Rate of Change in Capacitance with Temperature $\Delta C/C_{20}$ (%) | | Rate of Change in Capacitance with Temperature $\Delta C/C_{25}$ (%) | | CR Product ($\Omega \cdot F$) | Average Service Life (h) |
|---|---|---|---|---|---|---|---|---|---|
| | | | | −25° C. | +85° C. | −55° C. | +125° C. | | |
| 31 | 1240 | 3190 | 1.7 | −0.3 | −9.1 | −5.4 | −15.8 | 13200 | 280 |
| 32 | 1240 | 3100 | 1.8 | −0.2 | −8.8 | −4.3 | −15.2 | 12900 | 290 |
| 33 | 1220 | 2890 | 1.5 | 0.2 | −7.6 | −2.8 | −13.4 | 12000 | 270 |

TABLE 8-continued

| Sample No. | Sintering Temperature (° C.) | ε | tan δ (%) | Rate of Change in Capacitance with Temperature ΔC/C$_{20}$ (%) -25° C. | Rate of Change in Capacitance with Temperature ΔC/C$_{20}$ (%) +85° C. | Rate of Change in Capacitance with Temperature ΔC/C$_{25}$ (%) -55° C. | Rate of Change in Capacitance with Temperature ΔC/C$_{25}$ (%) +125° C. | CR Product (Ω · F) | Average Service Life (h) |
|---|---|---|---|---|---|---|---|---|---|
| 34 | 1220 | 2900 | 1.6 | 0.2 | −7.8 | −2.6 | −13.3 | 12100 | 310 |
| 35 | 1240 | 2920 | 1.7 | 0.1 | −8.3 | −3.4 | −14.3 | 12500 | 290 |

As shown in comparisons of sample Nos. 33 to 35 in Table 8 with sample No. 19 in Example 1, the compositions containing about 7.0 moles or less of X(Zr,Hf)O$_3$ as an accessory component causes an increased CR product and had prolonged average service life. Thus, the monolithic ceramic capacitor shows improved reliability.

The dielectric ceramic compositions of Examples 1 to 4 in accordance with the present invention had average crystal diameters of 1 μm or less.

In Examples 1 to 4, barium titanate synthesized by an oxalic acid process is used. Barium titanate synthesized by other processes, such as an alkoxide process and a hydrothermal synthesis, may also be used.

The barium titanate major component contains some impurities, such as alkaline earth oxides, e.g., SrO and CaO, alkali metal oxides, e.g., Na$_2$O and K$_2$O, and other compounds, e.g., Al$_2$O$_3$. In particular, the alkali metal oxides such as Na$_2$O and K$_2$O significantly affect electrical characteristics. Thus, the alkali metal oxide content in the barium titanate is preferably less than 0.02 percent by weight to maintain satisfactory electrical characteristics.

Oxides, such as Y$_2$O$_3$, Sm$_2$O$_3$, Eu$_2$O$_3$, MgO and SiO$_2$ are used as accessory components in Examples 1 to 4. Other compounds, such as carbonates, alkoxides, and organic metals, may also be used in the present invention.

The compound oxide of the dielectric ceramic composition in accordance with the present invention may contain other types of accessory components, such as V, W, Nb and Ta, in a total amount of about 5 moles as oxides thereof with respect to 100 moles of barium titanate.

As described above, the dielectric ceramic composition of the present invention satisfies the B characteristic defined by the JIS and the X7R characteristic defined by the EIA standard with respect to dependence of electrostatic capacitance on temperature and has a flat temperature characteristic. Thus, a monolithic ceramic capacitor employing this dielectric ceramic composition as dielectric layers can be used in any electronic device to be used at a location having large temperature changes.

The dielectric ceramic composition of the present invention has an average crystal grain diameter of as low as 1 μm, a relative dielectric constant (ε) of at least 2,500, a CR product of insulation resistance (R) and electrostatic capacitance (C) when a voltage of 4 kVDC/mm is applied at room temperature of at least 5,000 Ω·F, and a prolonged service life with respect to insulating resistance in a high-temperature, high-voltage accelerated test. The monolithic ceramic capacitor has improved reliability when the thickness of the dielectric ceramic layers is decreased. Thus, the monolithic ceramic capacitor using these thin dielectric ceramic layers can be miniaturized, has large capacitance, and can be used at high rated voltages. For example, a compact monolithic ceramic capacitor which includes dielectric ceramic layers having a small thickness of 3 μm or less also has a large capacitance.

While the invention has been particularly shown and described with reference to preferred embodiments thereof, it will be understood by those skilled in the art that the forgoing and other changes in form and details may be made therein without departing from the spirit of the invention.

What is claimed is:

1. A dielectric ceramic composition comprising a compound oxide comprising barium titanate Ba$_m$TiO$_3$ as a major component and RO$_{3/2}$, CaO, MgO and SiO$_2$, as accessory components, wherein R is at least one element selected from the group consisting of Y, Sm, Eu, Gd, Tb, Dy, Ho, Er, Tm and Yb;

wherein the compound oxide satisfies the following relationship:

100Ba$_m$TiO$_3$+aRO$_{3/2}$+bCaO+cMgO+dSiO$_2$ wherein, on a molar basis, 0.990≦m≦1.030,
0.5≦a≦6.0,
0.10≦b≦5.00,
0.010≦c<1.000, and
0.05≦d<2.00.

2. A dielectric ceramic composition according to claim 1, wherein the compound oxide further comprises a boron-containing compound in an amount not greater than about 5.5 moles on the basis of B$_2$O$_3$.

3. A dielectric ceramic composition according to claim 2, wherein the compound oxide further comprises a compound containing at least one element selected from the group consisting of Mn, Zn, Ni, Co and Cu in an amount not greater than about 5 moles on the basis of the oxide MO of the element M.

4. A dielectric ceramic composition according to claim 3, wherein the compound oxide further comprises a compound containing Zr, Hf, and at least one element selected from the group consisting of Ba, Ca and Sr in an amount not greater than about 7.0 moles on the basis of X(Zr,Hf)O$_3$ wherein X is at least one of Ba, Ca and Sr.

5. A dielectric ceramic composition according to claim 4, wherein R comprises Er, 1.005≦m≦1.01, 2.5≦a≦3.0, 0.5≦b≦2.00, 0.03≦c<0.07, and 1.4≦d≦1.5.

6. A dielectric ceramic composition according to claim 1, wherein the compound oxide further comprises a compound containing at least one element selected from the group consisting of Mn, Zn, Ni, Co and Cu in an amount not greater than about 5 moles on the basis of the oxide MO of the element M.

7. A dielectric ceramic composition according to claim 6, wherein the compound oxide further comprises a compound containing Zr, Hf, and at least one element selected from the group consisting of Ba, Ca and Sr in an amount not greater than about 7.0 moles on the basis of X(Zr,Hf)O$_3$ wherein X is at least one of Ba, Ca and Sr.

8. A dielectric ceramic composition according to claim 1, wherein the compound oxide further comprises a compound containing Zr, Hf, and at least one element selected from the group consisting of Ba, Ca and Sr in an amount not greater than about 7.0 moles on the basis of $X(Zr,Hf)O_3$ wherein X is at least one of Ba, Ca and Sr.

9. A monolithic ceramic capacitor comprising:

a plurality of dielectric ceramic layers;

a plurality of internal electrodes disposed between adjacent dielectric ceramic layers; and a pair of external electrodes, each electrically connected to one of the internal electrodes;

wherein each of the dielectric ceramic layers comprises a dielectric ceramic composition according to claim 8.

10. A monolithic ceramic capacitor according to claim 9 wherein each of the internal electrodes comprises a base metal.

11. A monolithic ceramic capacitor comprising:

a plurality of dielectric ceramic layers;

a plurality of internal electrodes disposed between adjacent dielectric ceramic layers; and a pair of external electrodes, each electrically connected to one of the internal electrodes;

wherein each of the dielectric ceramic layers comprises a dielectric ceramic composition according to claim 6.

12. A monolithic ceramic capacitor according to claim 11 wherein each of the internal electrodes comprises a base metal.

13. A monolithic ceramic capacitor comprising:

a plurality of dielectric ceramic layers;

a plurality of internal electrodes disposed between adjacent dielectric ceramic layers; and a pair of external electrodes, each electrically connected to one of the internal electrodes;

wherein each of the dielectric ceramic layers comprises a dielectric ceramic composition according to claim 4.

14. A monolithic ceramic capacitor according to claim 13 wherein each of the internal electrodes comprises a base metal.

15. A monolithic ceramic capacitor comprising:

a plurality of dielectric ceramic layers;

a plurality of internal electrodes disposed between adjacent dielectric ceramic layers; and a pair of external electrodes, each electrically connected to one of the internal electrodes;

wherein each of the dielectric ceramic layers comprises a dielectric ceramic composition according to claim 2.

16. A monolithic ceramic capacitor according to claim 15 wherein each of the internal electrodes comprises a base metal.

17. A monolithic ceramic capacitor comprising:

a plurality of dielectric ceramic layers;

a plurality of internal electrodes disposed between adjacent dielectric ceramic layers; and a pair of external electrodes, each electrically connected to one of the internal electrodes;

wherein each of the dielectric ceramic layers comprises a dielectric ceramic composition according to claim 1.

18. A monolithic ceramic capacitor according to claim 17 wherein each of the internal electrodes comprises a base metal.

\* \* \* \* \*